US012603046B2

(12) United States Patent
Lin et al.

(10) Patent No.: US 12,603,046 B2
(45) Date of Patent: Apr. 14, 2026

(54) ELECTRONIC APPARATUS AND DRIVING CIRCUIT

(71) Applicant: Novatek Microelectronics Corp., Hsinchu (TW)

(72) Inventors: Kun-Zheng Lin, Hsinchu City (TW); Wei-Lun Shih, Hsinchu City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/800,138

(22) Filed: Aug. 12, 2024

(65) Prior Publication Data

US 2025/0078754 A1 Mar. 6, 2025

Related U.S. Application Data

(60) Provisional application No. 63/536,041, filed on Aug. 31, 2023.

(30) Foreign Application Priority Data

May 14, 2024 (TW) ................................ 113117690

(51) Int. Cl.
*G09G 3/3233* (2016.01)

(52) U.S. Cl.
CPC ... *G09G 3/3233* (2013.01); *G09G 2300/0842* (2013.01); *G09G 2310/06* (2013.01); *G09G 2310/08* (2013.01); *G09G 2320/0233* (2013.01)

(58) Field of Classification Search
CPC ......... G09G 3/3233; G09G 2300/0842; G09G 2310/06; G09G 2310/08; G09G 2320/0233
See application file for complete search history.

(56) References Cited

U.S. PATENT DOCUMENTS

| | | | | |
|---|---|---|---|---|
| 12,148,372 B2 * | 11/2024 | Zhang | G09G 3/3233 |
| 12,230,205 B2 | 2/2025 | Yuan et al. | |
| 2009/0309865 A1 * | 12/2009 | Kohno | G09G 3/3233<br>345/82 |
| 2021/0201790 A1 * | 7/2021 | Gai | G09G 3/3233 |
| 2022/0262313 A1 | 8/2022 | Wang | |
| 2022/0351686 A1 | 11/2022 | Wang et al. | |
| 2023/0104904 A1 * | 4/2023 | Kim | G09G 3/3258<br>345/204 |

(Continued)

FOREIGN PATENT DOCUMENTS

| | | |
|---|---|---|
| CN | 115035852 | 9/2022 |
| CN | 115512656 | 12/2022 |
| CN | 116092430 | 5/2023 |

OTHER PUBLICATIONS

"Office Action of Taiwan Counterpart Application", issued on May 12, 2025, p. 1-p. 7.

*Primary Examiner* — Jeff Piziali
(74) *Attorney, Agent, or Firm* — JCIPRNET

(57) ABSTRACT

An electronic apparatus including a display panel and a driving circuit is provided. The display panel includes a plurality of display units. Each of the display units includes a light-emitting element. The driving circuit is coupled to the display panel. The driving circuit is configured to output a scan signal and a reset signal. When a reset interval of the scan signal is transmitted in a non-display area of the display panel, the driving circuit compensates the reset signal and outputs the compensated reset signal to reset the light-emitting element.

11 Claims, 10 Drawing Sheets

122

(56) References Cited

U.S. PATENT DOCUMENTS

| | | | | |
|---|---|---|---|---|
| 2023/0230547 | A1 | 7/2023 | Yuan et al. | |
| 2024/0005868 | A1* | 1/2024 | Kim | G09G 3/3233 |
| 2024/0249661 | A1* | 7/2024 | Jin | G09G 3/2096 |
| 2024/0257720 | A1* | 8/2024 | Yeom | G09G 3/3233 |
| 2024/0321199 | A1 | 9/2024 | Yuan et al. | |
| 2024/0412676 | A1* | 12/2024 | Kim | G09G 3/3233 |

* cited by examiner

ELECTRONIC APPARATUS AND DRIVING CIRCUIT

CROSS-REFERENCE TO RELATED APPLICATION

This application claims the priority benefit of U.S. provisional applications Ser. No. 63/536,041, filed on Aug. 31, 2023 and Taiwan application serial no. 113117690, filed on May 14, 2024. The entirety of the above-mentioned patent application is hereby incorporated by reference herein and made a part of this specification.

BACKGROUND

Technical Field

The disclosure relates to an electronic apparatus and a driving circuit, and in particular relates to an electronic apparatus having a display panel and a driving circuit for driving the display panel.

Description of Related Art

An electronic apparatus having a display function usually includes a display panel and a driver chip. The driver chip is configured to drive the display panel to display images. Taking a self-luminous display panel as an example, the driver chip usually uses a reset signal to reset the voltage at one terminal of the light-emitting element before driving the light-emitting element to emit light. If the reset signal is directly output to drive the display panel without compensation, multiple dark band areas may appear in the display panel, thus affecting the display quality.

SUMMARY

An electronic apparatus and a driving circuit that may dynamically compensate the terminal voltage of a light-emitting element to prevent dark bands from appearing on a display panel are provided in the disclosure, thereby improving display quality.

The electronic apparatus according to the embodiment of the disclosure includes a display panel and a driving circuit. The display panel includes multiple display units. Each of the display units includes a light-emitting element. The driving circuit is coupled to the display panel. The driving circuit is configured to output a scan signal and a reset signal. When a reset interval of the scan signal is transmitted in a non-display area of the display panel, the driving circuit compensates the reset signal and outputs the compensated reset signal to reset the light-emitting element.

The driving circuit according to the embodiment of the disclosure is configured to drive the display panel. The driving circuit includes a voltage generating circuit and a control circuit. The voltage generating circuit is coupled to the display panel. The voltage generating circuit is configured to output a reset signal. The control circuit is coupled to the display panel. The control circuit is configured to output a scan signal. When a reset interval of the scan signal is transmitted in a non-display area of the display panel, the control circuit compensates the reset signal, and the voltage generating circuit outputs the compensated reset signal to reset the light-emitting element in the display panel.

In order to make the above-mentioned features and advantages of the disclosure comprehensible, embodiments accompanied with drawings are described in detail below.

DETAILED DESCRIPTION OF DISCLOSED EMBODIMENTS

Figure 1:
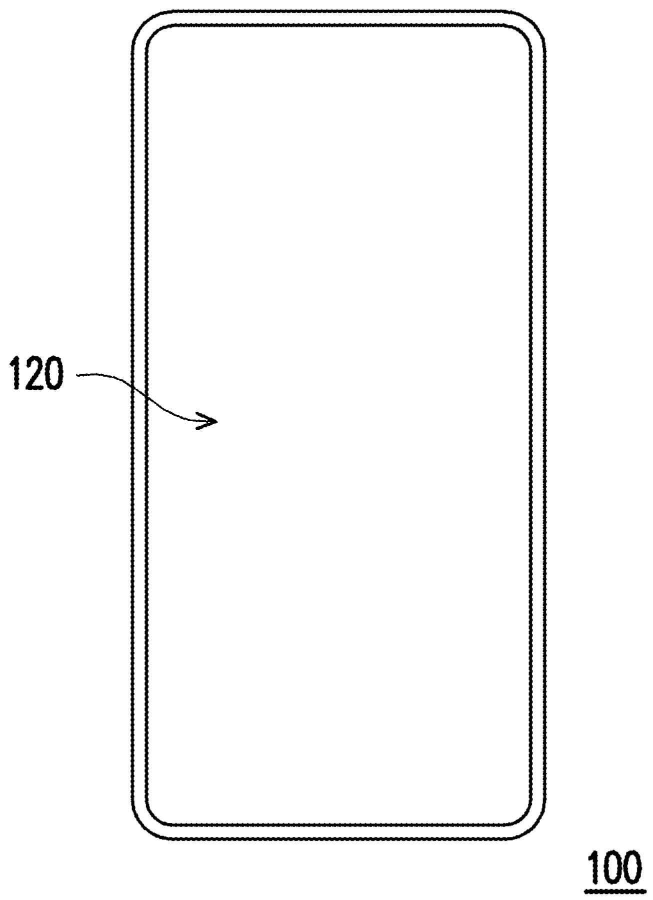
FIG. 1 is a schematic diagram of an electronic apparatus of an embodiment of the disclosure.

The term "coupled (or connected)" as used throughout this specification (including the scope of the application) may refer to any direct or indirect means of connection. For example, if it is described in the specification that a first device is coupled (or connected) to a second device, it should be construed that the first device may be directly connected to the second device, or the first device may be indirectly connected to the second device through another device or some type of connecting means. Terms "first," "second" and the like mentioned in the full text (including the scope of the patent application) of the description of this application are used only to name the elements or to distinguish different embodiments or scopes and are not intended to limit the upper or lower limit of the number of the elements, nor is it intended to limit the order of the elements. In addition, wherever possible, elements/components/steps with the same reference numerals in the drawings and embodiments represent the same or similar parts. Elements/components/steps that use the same reference numerals or use the same terminology in different embodiments may refer to relevant descriptions of each other.

Figure 2:
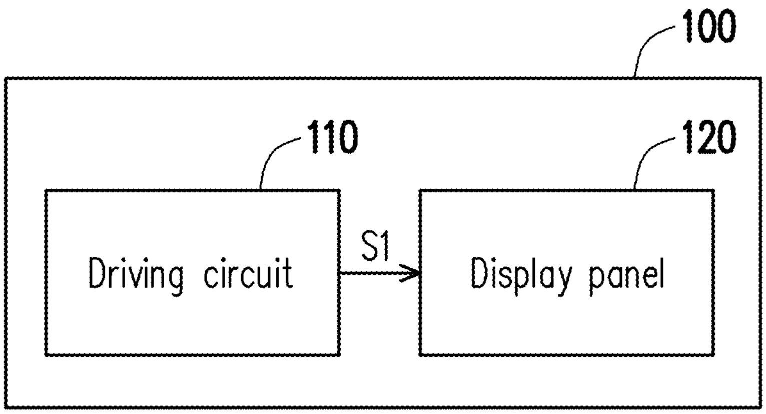
FIG. 2 is a block schematic diagram of the electronic apparatus of the embodiment of FIG. 1.

FIG. 1 is a schematic diagram of an electronic apparatus of an embodiment of the disclosure. FIG. 2 is a block schematic diagram of the electronic apparatus of the embodiment of FIG. 1. Referring to FIG. 1 and FIG. 2, the electronic apparatus 100 includes a driving circuit 110 and a display panel 120. The driving circuit 110 is coupled to the display panel 120. The display panel 120 may be a self-luminous display panel, such as an organic light-emitting diode (OLED) display panel, but the disclosure is not limited thereto. In other embodiments, the display panel 120 may also be a display panel including micro light-emitting diodes (micro LED) or mini light-emitting diodes (mini LED).

In this embodiment, the driving circuit 110 may output the reset signal S1 to reset the light-emitting elements in the display panel 120. The driving circuit 110 may compensate the reset signal S1 and output the compensated reset signal S1 to solve the issue of dark bands appearing in the display panel 120.

Figure 3B:
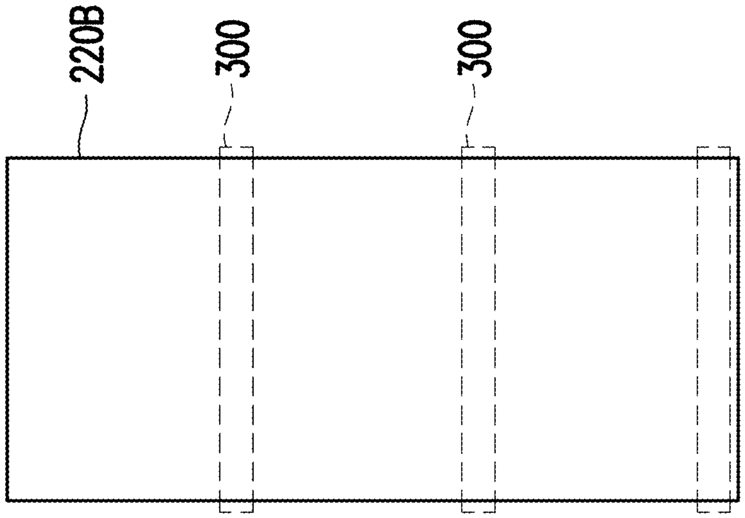
FIG. 3B is a schematic diagram of a display panel of an embodiment of the disclosure.
Figure 3A:
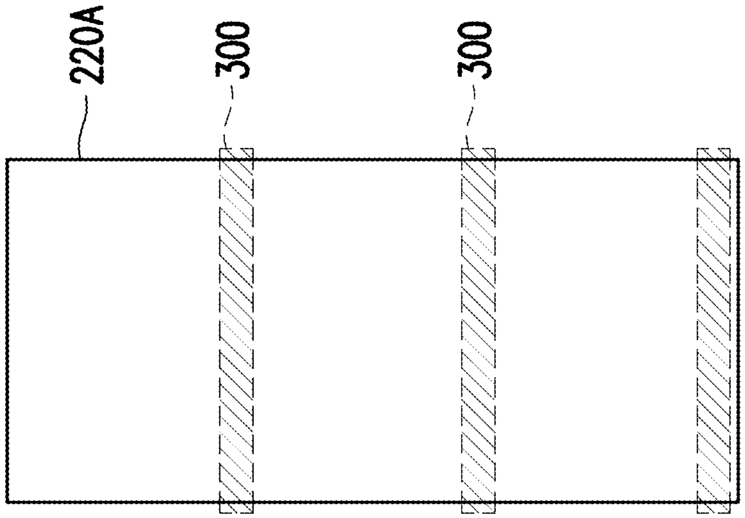
FIG. 3A is a schematic diagram of a display panel of the related art.

FIG. 3A is a schematic diagram of a display panel of the related art. FIG. 3B is a schematic diagram of a display panel of an embodiment of the disclosure. Referring to FIG. 3A and FIG. 3B, if the reset signal S1 is directly output to drive the display panel 220A without compensation, dark band 300 as shown in FIG. 3A may appear in the display panel 220A. In FIG. 3B, the driving circuit 110 compensates the reset signal S1 and outputs the compensated reset signal S1 to reset the light-emitting elements in the display panel 220B. In this way, the issue of dark bands appearing in the display panel 220A may be solved by using the signal compensation method proposed by the embodiment of the disclosure.

In the embodiment of FIG. 1, the electronic apparatus 100 may be an electronic apparatus having a display function, a touch sensing function, or a fingerprint sensing function. In one embodiment, the electronic apparatus 100 may be, but is not limited to, a smartphone, a non-smartphone, a wearable electronic apparatus, a tablet, a personal digital assistant, a laptop, and other portable electronic apparatuses that may be operated independently and have display functions, touch sensing functions or fingerprint sensing functions. In one embodiment, the electronic apparatus 100 may be, but is not limited to, a portable or non-portable electronic apparatus in a vehicle intelligence system. In embodiments, the electronic apparatus 100 may be, but is not limited to, a smart home appliance, such as a television, a computer, a refrigerator, a washing machine, a telephone, an induction cooker, a desk lamp, etc.

Figure 4:
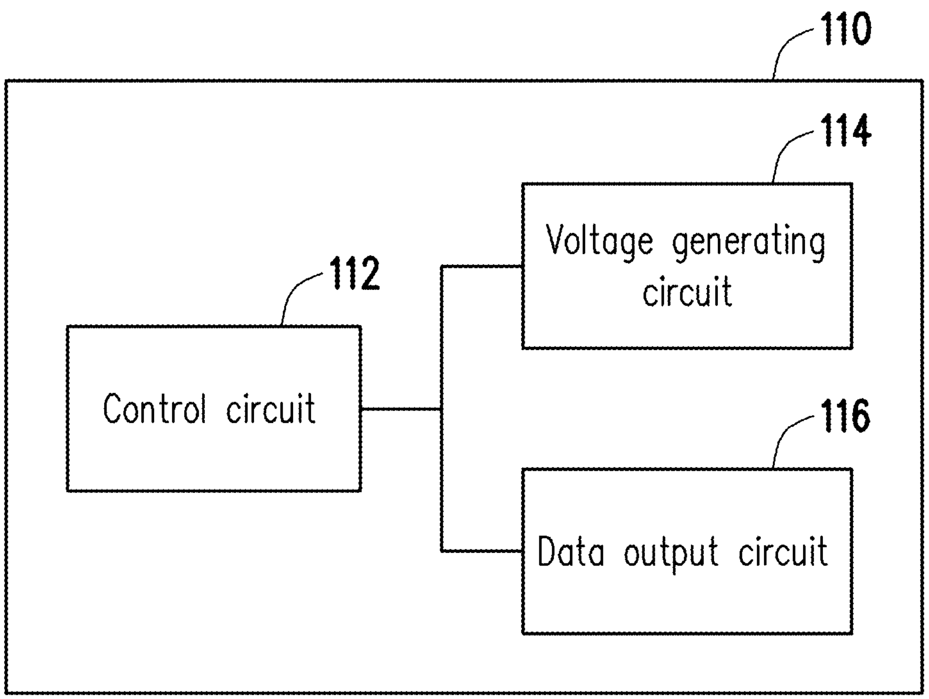
FIG. 4 is a block schematic diagram of the driving circuit of the embodiment of FIG. 1.

FIG. 4 is a block schematic diagram of the driving circuit of the embodiment of FIG. 1.

Figure 5:
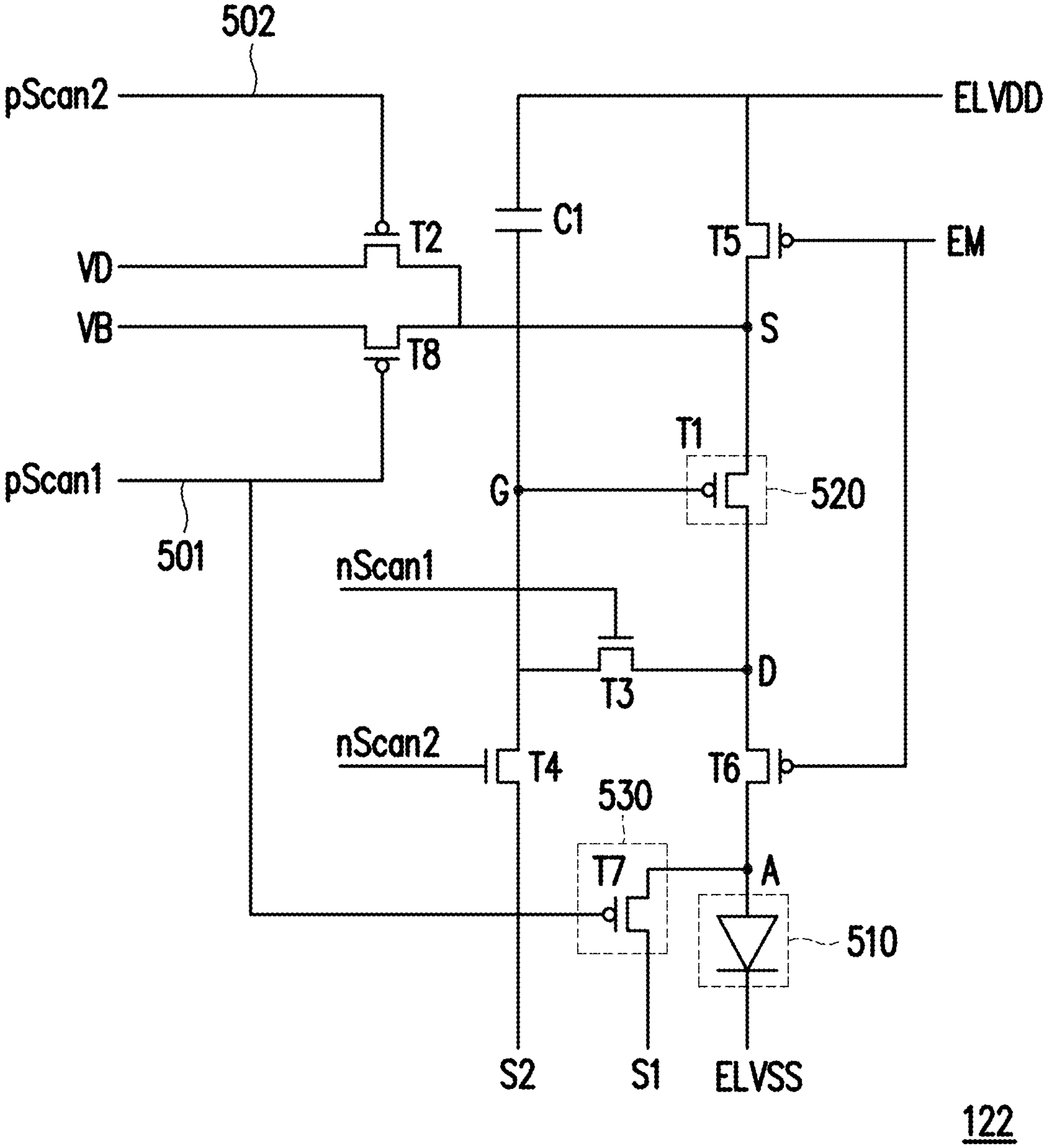
FIG. 5 is a circuit schematic diagram of the display unit in the display panel of the embodiment of FIG. 1.
Figure 6:
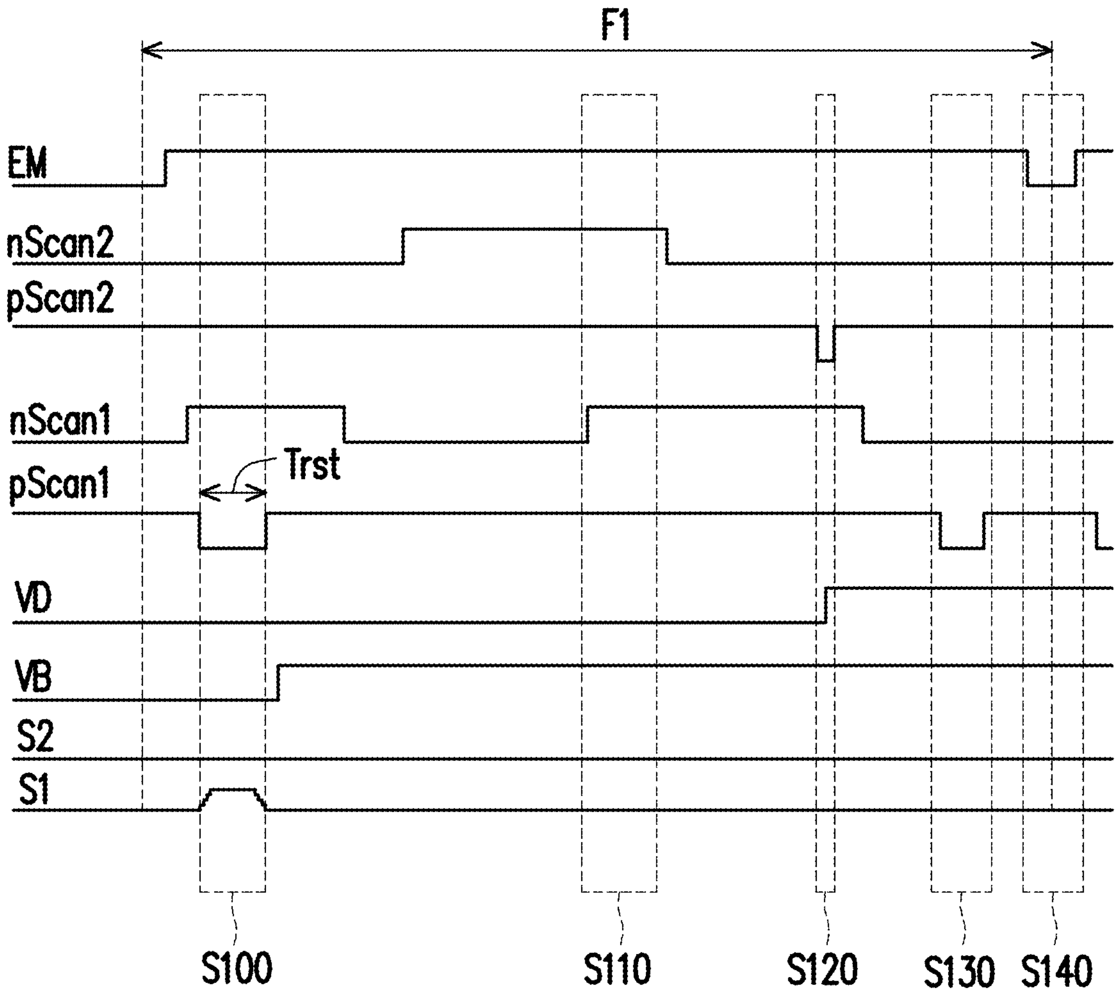
FIG. 6 is a waveform schematic diagram of each signal in the display unit of the embodiment of FIG. 5.

FIG. 5 is a circuit schematic diagram of the display unit in the display panel of the embodiment of FIG. 1. FIG. 6 is a waveform schematic diagram of each signal in the display unit of the embodiment of FIG. 5. Referring to FIG. 4 to FIG. 6, the display panel 120 includes multiple first scan lines 501, multiple second scan lines 502, and multiple display units 122. The display unit 122 is coupled to the driving circuit 110 through the first scan line 501 and the second scan line 502.

The display unit 122 is, for example, a pixel circuit on the display panel 120. The display unit 122 includes multiple transistor elements T1 to T8, a capacitor element C1, and a light-emitting element 510, in which the transistor element T1 serves as the driving element 520 and the transistor element T7 serves as the reset element 530. The light-emitting element 510 is, for example, an organic light-emitting diode. Specifically, the light-emitting element 510 has a first terminal and a second terminal, which are respectively the anode and the cathode of the organic light-emitting diode. The first terminal of the light-emitting element 510 is coupled to the first terminal of the reset element 530, and the second terminal of the light-emitting element 510 is coupled to the first voltage ELVSS. The reset element 530 has a first terminal, a second terminal, and a control terminal. The first terminal of the reset element 530 is coupled to the first terminal of the light-emitting element 510, and the second terminal of the reset element 530 is coupled to the reset signal S1. The control terminal of the reset element 530 is coupled to the corresponding first scan line 501. When the reset element 530 is turned on by the scan signal pScan1, the reset signal S1 may reset the first terminal of the light-emitting element 530. In addition, the connection relationship between other components and signals in the display unit 122 is as shown in FIG. 5.

On the other hand, the driving circuit 110 includes a control circuit 112, a voltage generating circuit 114, and a data output circuit 116. The control circuit 112 may be configured to output the scan signals pScan1, pScan2, nScan1, nScan2 and the driving signal EM to the corresponding transistor elements to control the conduction state of the corresponding transistor elements. In one embodiment, the scan signal may be output by a gate on array (GOA) on the display panel 120 according to the control signal of the control circuit 112.

The voltage generating circuit 114 may be configured to output the reset signals S1, S2 and the bias signal VB to reset or provide a bias voltage to the corresponding circuit node. Therefore, the driving circuit 110 may be configured to output the scan signal pScan1 and the reset signal S1 to the display panel 120. In one embodiment, the bias signal VB is, for example, a positive voltage. The voltage generating circuit 114 further outputs the first voltage ELVSS and the second voltage ELVDD to the display unit 122 as operating voltages. The first voltage ELVSS is the system low voltage, and the second voltage ELVDD is the system high voltage. In addition, the data output circuit 116 may be configured to output the data voltage VD to write the corresponding display data into the display unit 122 in the writing frame F1.

In the embodiment of FIG. 4, the control circuit 112 may be a processor with computing capabilities. Alternatively, the control circuit 112 may be designed using hardware description languages (HDL) or any other digital circuit design method familiar to those skilled in the art, and may be implemented as a hardware circuit through field programmable gate array (FPGA), complex programmable logic device (CPLD), or application-specific integrated circuit (ASIC). In addition, regarding the hardware structures of the control circuit 112, the voltage generating circuit 114, and the data output circuit 116, reference may be made to common knowledge in the relevant technology to obtain sufficient teachings, suggestions and implementation instructions.

In the embodiment of FIG. 5, the number of transistors and capacitors is not limited to the disclosure. That is, the signal compensation method proposed by the embodiment of the disclosure is not limited to application in the circuit structure of FIG. 5.

Referring to FIG. 6 again, FIG. 6 is the operation time sequence of the display unit 122 and the waveforms of each signal. In the writing frame F1, the operation time sequence of the display unit 122 may be roughly divided into steps S100 to S140.

In step S100, the transistor elements T3, T7, and T8 are turned on, and the transistor elements T2, T4, T5, and T6 are not turned on. The bias signal VB resets the first terminal S of the transistor element T1, and the reset signal S1 resets the first terminal A of the light-emitting element 510. Taking an organic light-emitting diode as an example, the reset signal S1 is configured to reset the anode voltage of the organic light-emitting diode. In step S100, the scan signal pScan1 is at a low level in the reset interval Trst, which may be configured to turn on the transistor element T7, so that the reset signal S1 may reset the first terminal A of the light-emitting element 510. The level of the scan signal pScan1 in the reset interval Trst is not used to limit the disclosure.

In step S110, the transistor elements T3 and T4 are turned on, and the transistor elements T2, T5, T6, T7, and T8 are not turned on. The reset signal S2 resets the second terminal D and the control terminal G of the transistor element T1.

In step S120, the transistor elements T1, T2, and T3 are turned on, and the transistor elements T4, T5, T6, T7, and T8 are not turned on. The data voltage VD may be written to the control terminal G of the transistor element T1.

In step S130, the transistor elements T7 and T8 are turned on, and the transistor elements T2, T3, T4, T5, and T6 are not turned on. The bias signal VB resets the first terminal S of the transistor element T1 again, and the reset signal S1 resets the first terminal A of the light-emitting element 510 again.

In step S140, the transistor elements T1, T5, and T6 are turned on, and the transistor elements T2, T3, T4, T7, and T8 are not turned on. The light-emitting element 510 may be driven to emit light by driving current through the transistor elements T1, T5, and T6.

In the embodiment of FIG. 6, since the scan signal pScan1 may include multiple reset intervals Trst when driving the entire display panel 120, the reset interval Trst may turn on the transistor element T7. When the reset interval Trst of the scan signal pScan1 is transmitted in the non-display area of the display panel 120, a dark band 300 as shown in FIG. 3A may appear in the display panel 220A. The non-display area here is, for example, a porch area or a blanking area of the display panel 120.

Therefore, if the driving circuit 110 does not compensate for the reset signal S1, for example, it only provides a fixed low level reset signal S1, then the voltage of the reset signal S1 will change with the impedance change of the first terminal A of the light-emitting element 510, thereby affecting the effectiveness of the reset signal S1 in resetting the first terminal A of the light-emitting element 510.

Therefore, in the embodiment of the disclosure, when the reset interval Trst of the scan signal pScan1 is transmitted in the non-display area of the display panel 120, the driving circuit 110 compensates the reset signal S1 and outputs the compensated reset signal S1 to reset the first terminal A of the light-emitting element 510. That is, taking the organic light-emitting diode as an example, the signal compensation method of the embodiment of the disclosure may dynamically compensate the anode voltage of the organic light-emitting diode.

Figure 7:
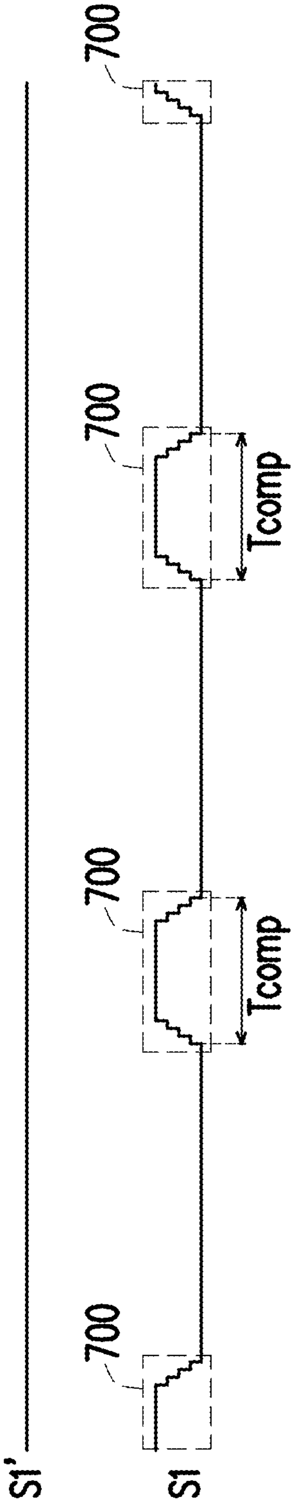
FIG. 7 is a waveform schematic diagram of a reset signal of an embodiment of the disclosure.

FIG. 7 is a waveform schematic diagram of a reset signal of an embodiment of the disclosure. Referring to FIG. 7, in FIG. 7, the reset signal S1' is an uncompensated reset signal, and the reset signal S1 is a reset signal compensated by the signal compensation method of the embodiment of the disclosure.

The uncompensated reset signal S1' is, for example, a fixed low level voltage signal. The compensated reset signal S1 includes, for example, multiple compensation intervals Tcomp. The driving circuit 110 may determine the position and width of the compensation interval Tcomp according to the position and width of the reset interval Trst of the scan signal pScan1. In this embodiment, the compensated reset signal S1 is the step signal 700 in the compensation interval Tcomp. The waveform of the step signal 700 is only used for illustration and is not intended to limit the disclosure.

The following describes how the driving circuit 110 compensates the reset signal S1 to determine the position and width of the compensation interval Tcomp and the waveform of the step signal 700.

Figure 8:
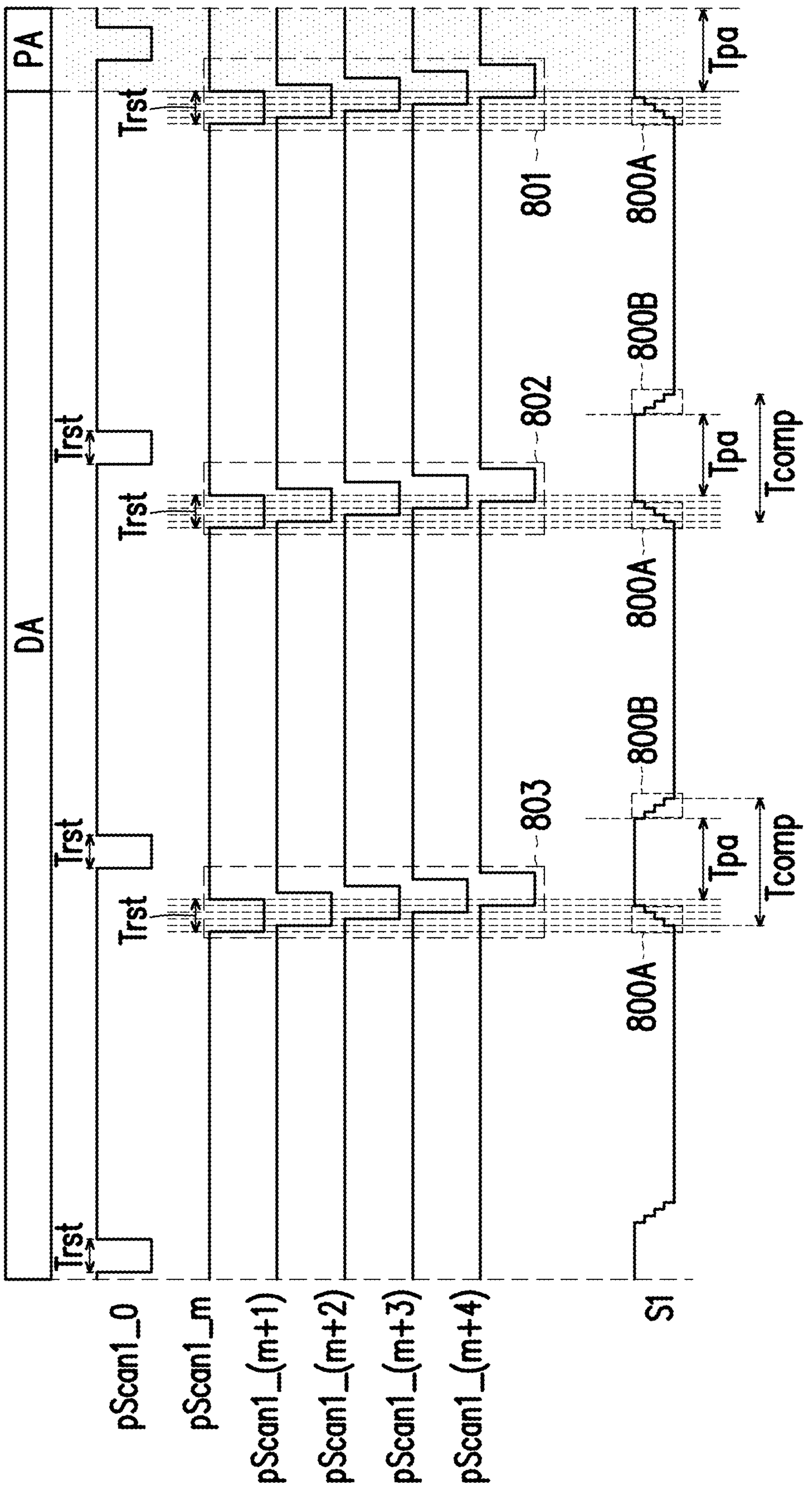
FIG. 8 is a waveform schematic diagram for driving a display panel of an embodiment of the disclosure.

FIG. 8 is a waveform schematic diagram for driving a display panel of an embodiment of the disclosure. Referring to FIG. 1, FIG. 2, and FIG. 8, FIG. 8 shows an embodiment in which the driving circuit 110 compensates the reset signal S1 when the reset interval Trst of the scan signals pScan1_*m*, pScan1_(*m*+1), pScan1_(*m*+2), pScan1_(*m*+3), pScan1_(*m*+4) enters the non-display area PA of the display panel 120.

Specifically, in FIG. 8, the scan signal pScan1_0 is a scan signal output from the driving circuit 110 to the display panel 120. The scan signal pScan1_0 includes multiple reset intervals Trst. The scan signals pScan1_*m*, pScan1_(*m*+1), pScan1_(*m*+2), pScan1_(*m*+3), pScan1_(*m*+4) (hereinafter briefly referred to as pScan1) are respectively transmitted on five adjacent different scan lines 501 on the display panel 120. A part of each scan signal pScan1 corresponds to the display area DA of the display panel 120, and the other part corresponds to the non-display area PA of the display panel 120. Each scan signal pScan1 also includes multiple reset intervals Trst.

On the other hand, the reset signal S1 is a compensated reset signal. The compensated reset signal S1 includes multiple compensation intervals Tcomp. The compensation interval Tcomp includes the high level interval Tpa and the width of the step signals 800A and 800B.

FIG. 8 is the waveforms of the scan signal pScan1 transmitted on different scan lines 501. As the scan signal pScan1 is transmitted to the area close to the front end portion corresponding to the non-display area PA, the reset interval Trst of the scan signal pScan1 begins to enter the non-display area PA of the display panel 120, as shown by the dashed frame portion 801. At this time, in the display area DA, at the position of the reset interval Trst corresponding to the scan signal pScan1, as shown in the dashed frame portion 802 and 803, the driving circuit 110 compensates the reset signal S1, such as gradually increasing the voltage level of the reset signal S1, so that it has the waveform of the step signal 800A in the compensation interval Tcomp. Then, the reset signal S1 remains at a high level for an interval Tpa, and the width of this interval Tpa is substantially equal to the width of the non-display area PA. That is, the driving circuit 110 may determine the width of the interval Tpa according to the width of the non-display area PA of the display panel 120, thereby determining the width of the compensation interval Tcomp. Afterwards, the driving circuit 110 also uses a step adjustment method to gradually adjust the voltage level of the reset signal S1 back to a low level, as shown in the waveform of the step signal 800B.

Therefore, the driving circuit 110 compensates the reset signal S1 according to the position of the reset interval Trst. For example, the driving circuit 110 determines the position of the compensation interval Tcomp according to the position of the reset interval Trst, and aligns the position of the compensation interval Tcomp correspondingly with the position of the reset interval Trst. In this way, the driving circuit 110 resets the first terminal A of the light-emitting element 510 by using the compensated reset signal S1, which may prevent dark bands from appearing in the display panel 120.

In one embodiment, the width of the reset interval Trst of the scan signal pScan1 corresponds to the number of signal lines (e.g., data lines) of the display panel 120. For example, the width of each reset interval Trst of the scan signal pScan1 corresponds to four signal lines. Therefore, when the reset interval Trst of the scan signal pScan1 begins to enter the non-display area PA of the display panel 120, the driving circuit 110 gradually increases the voltage level of the reset signal S1. Therefore, the number of steps of the step signal 800A is four, which is equal to the number of signal lines corresponding to the width of the reset interval Trst. That is, the driving circuit 110 may determine the width of the step signals 800A and 800B according to the width of the reset interval Trst, thereby determining the width of the compensation interval Tcomp.

Figure 9:
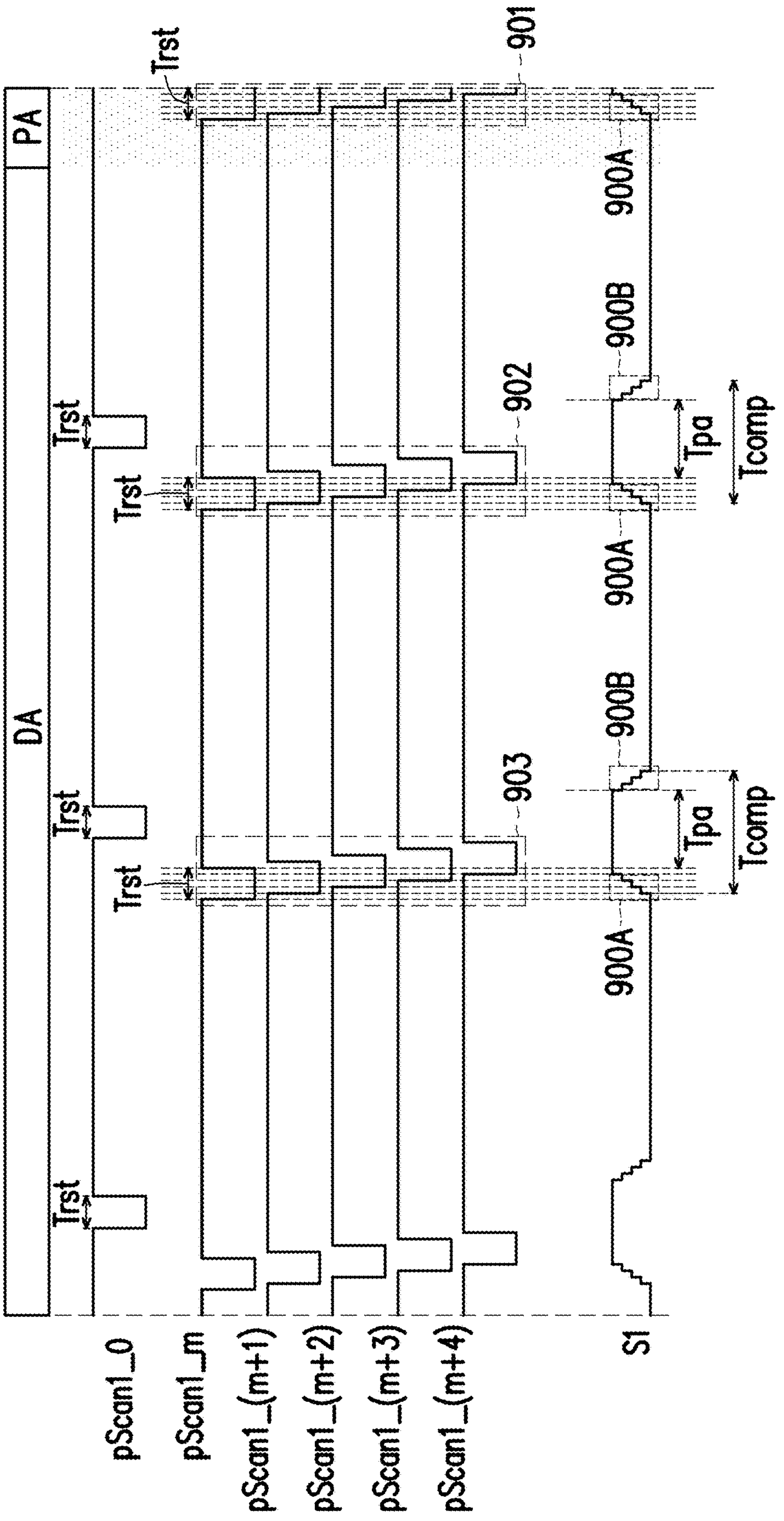
FIG. 9 is a waveform schematic diagram for driving a display panel of another embodiment of the disclosure.

FIG. 9 is a waveform schematic diagram for driving a display panel of another embodiment of the disclosure. Referring to FIG. 1, FIG. 2, and FIG. 9, FIG. 9 shows an embodiment in which the driving circuit 110 compensates the reset signal S1 when the reset interval Trst of the scan signals pScan1_*m*, pScan1_(*m*+1), pScan1_(*m*+2), pScan1_(*m*+3), pScan1_(*m*+4) leaves the non-display area PA of the display panel 120.

Specifically, FIG. 9 is the waveforms of the scan signal pScan1 transmitted on different scan lines 501. As the scan signal pScan1 is transmitted to the area close to the rear end portion corresponding to the non-display area PA, the reset interval Trst of the scan signal pScan1 prepares to leave the non-display area PA of the display panel 120, as shown by the dashed frame portion 901. At this time, in the display area DA, at the position of the reset interval Trst corresponding to the scan signal pScan1, as shown in the dashed frame portion 902 and 903, the driving circuit 110 compensates the reset signal S1, such as gradually increasing the voltage level of the reset signal S1, so that it has the waveform of the step signal 900A in the compensation interval Tcomp. Then, the reset signal S1 remains at a high level for an interval Tpa, and the width of this interval Tpa is substantially equal to the width of the non-display area PA. Afterwards, the driving circuit 110 also uses a step adjustment method to gradually adjust the voltage level of the reset signal S1 back to a low level, as shown in the waveform of the step signal 900B.

Therefore, the driving circuit 110 may compensate the reset signal S1 according to the position of the reset interval Trst. For example, the driving circuit 110 determines the position of the compensation interval Tcomp according to the position of the reset interval Trst, and aligns the position of the compensation interval Tcomp correspondingly with the position of the reset interval Trst. In this way, the driving circuit 110 resets the first terminal A of the light-emitting element 510 by using the compensated reset signal S1, which may prevent dark bands from appearing in the display panel 120.

In the embodiments of FIG. 8 and FIG. 9, the number of steps of the step signals 800A, 800B, 900A, and 900B and the number of signal lines corresponding to the width of the reset interval Trst are only for illustration and are not intended to limit the disclosure.

In the embodiments of FIG. 8 and FIG. 9, the driving circuit 110 determines the position, width and step signal waveform of the compensation interval Tcomp according to the scan signal pScan1 transmitted on the display panel 120, but the disclosure is not limited thereto. In one embodiment, since the scan signal pScan1 may be generated by the scan signal pScan1_0, the driving circuit 110 may also determine the position, width and step signal waveform of the compensation interval Tcomp according to the scan signal pScan1_0 it outputs.

Figure 10:
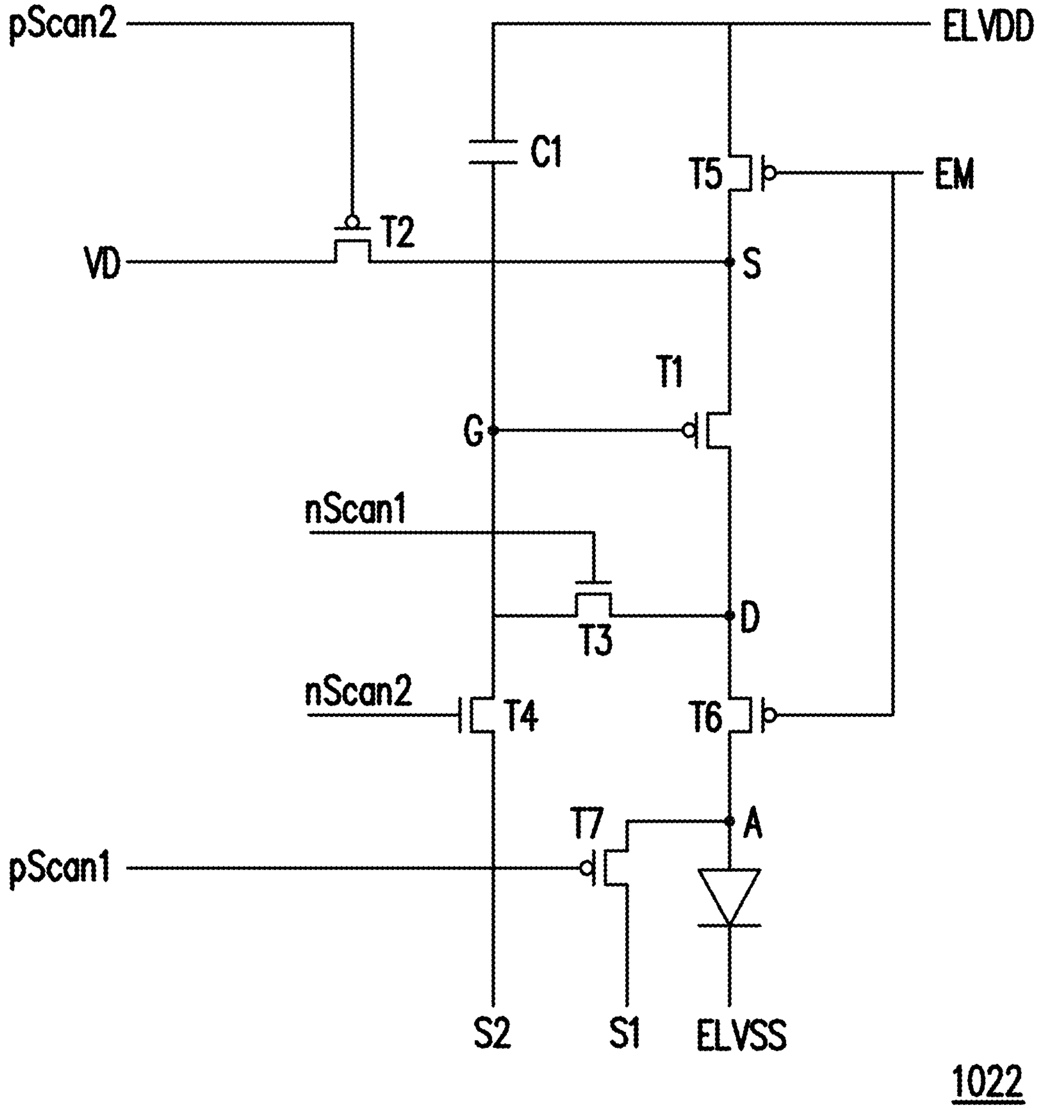
FIG. 10 is a circuit schematic diagram of a display unit in a display panel of another embodiment of the disclosure.

FIG. 10 is a circuit schematic diagram of a display unit in a display panel of another embodiment of the disclosure. Referring to FIG. 10, the display unit 1022 is, for example, another embodiment of a pixel circuit on the display panel 120. In this embodiment, the display unit 122 includes seven transistor elements T1 to T7, a capacitor element C1, and a light-emitting element 1010. Regarding the operation of the display unit 1022, sufficient teachings, suggestions and implementation instructions may be obtained with reference to the embodiment of FIG. 5. That is to say, the number of transistors and capacitors in FIG. 5 does not limit the disclosure. The signal compensation method proposed by the embodiment of the disclosure may also be applied to the circuit structure of FIG. 10.

In summary, in embodiments of the disclosure, the driving circuit may determine the position, width and signal waveform of the compensation interval of the reset signal according to the scan signal to dynamically compensate the terminal voltage of the light-emitting element. In this way, dark bands in the display panel may be avoided, thereby improving display quality.

Although the disclosure has been described in detail with reference to the above embodiments, they are not intended to limit the disclosure. Those skilled in the art should understand that it is possible to make changes and modifications without departing from the spirit and scope of the disclosure. Therefore, the protection scope of the disclosure shall be defined by the following claims.

What is claimed is:

1. A driving circuit, configured to drive a display panel, the driving circuit comprising:

a voltage generating circuit, coupled to the display panel and configured to output a reset signal; and a control circuit, coupled to the display panel and configured to output a scan signal, wherein when a reset interval of the scan signal is transmitted in a non-display area of the display panel, the control circuit compensates the reset signal, and the voltage generating circuit outputs the compensated reset signal to reset a light-emitting diode in the display panel.

2. The driving circuit according to claim 1, wherein the scan signal comprises a plurality of reset intervals, and the control circuit compensates the reset signal according to positions of the reset intervals.

3. The driving circuit according to claim 2, wherein the compensated reset signal comprises a plurality of compensation intervals, and the control circuit determines positions of the compensation intervals according to the positions of the reset intervals.

4. The driving circuit according to claim 3, wherein the positions of the compensation intervals correspond to the positions of the reset intervals.

5. The driving circuit according to claim 3, wherein the control circuit determines a width of a corresponding compensation interval according to a width of each of the reset intervals.

6. The driving circuit according to claim 5, wherein the control circuit further determines the width of the corresponding compensation interval according to a width of the non-display area of the display panel.

7. The driving circuit according to claim 3, wherein a width of each of the reset intervals corresponds to a plurality of signal lines of the display panel, and the compensated reset signal is a step signal in the compensation intervals, wherein a number of steps of the step signal is equal to a number of the signal lines.

8. The driving circuit according to claim 1, wherein the control circuit compensates the reset signal when the reset interval of the scan signal enters the non-display area of the display panel.

9. The driving circuit according to claim 1, wherein the control circuit compensates the reset signal when the reset interval of the scan signal leaves the non-display area of the display panel.

10. The driving circuit according to claim 1, wherein the display panel comprises a plurality of scan lines and a plurality of display units, and each of the display units comprises:

the light-emitting diode has a first terminal and a second terminal, wherein the first terminal of the light-emitting diode is coupled to the reset circuit, and the second terminal of the light-emitting diode is coupled to a first voltage; and a reset circuit has a first terminal, a second terminal, and a control terminal, wherein the first terminal of the reset circuit is coupled to the first terminal of the light-emitting diode, the second terminal of the reset circuit is coupled to the reset signal, and the control terminal of the reset circuit is coupled to a corresponding scan line, wherein the reset signal resets the first terminal of the light-emitting diode when the reset circuit is turned on by the scan signal.

11. A driving circuit, configured to drive a display panel, the driving circuit comprising:

a voltage generating circuit, coupled to the display panel and configured to output a reset signal; and a control circuit, coupled to the display panel and configured to output a scan signal, wherein when a reset interval of the scan signal is transmitted in a non-display area of the display panel, the control circuit compensates the reset signal, and the voltage generating circuit outputs the compensated reset signal to reset a light-emitting diode in the display panel, wherein the non-display area comprises a porch area or a blanking area of the display panel.

* * * * *